United States Patent
Ruellan et al.

(10) Patent No.: US 7,565,378 B2
(45) Date of Patent: Jul. 21, 2009

(54) METHOD AND DEVICE FOR PROCESSING MESSAGES OF THE SOAP TYPE

(75) Inventors: Herve Ruellan, Rennes (FR); Youenn Fablet, La Dominelais (FR); Jean-Jacques Moreau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 461 days.

(21) Appl. No.: 10/837,661

(22) Filed: May 4, 2004

(65) Prior Publication Data

US 2004/0236732 A1    Nov. 25, 2004

(30) Foreign Application Priority Data

May 19, 2003   (FR)   ................................. 03 05962

(51) Int. Cl.
*G06F 17/00* (2006.01)
(52) U.S. Cl. .................. 707/104.1; 707/101; 707/102; 707/103 R
(58) Field of Classification Search .............. 707/1–10, 707/100–104.1, 200–206
See application file for complete search history.

(56) References Cited

U.S. PATENT DOCUMENTS

| | | | | |
|---|---|---|---|---|
| 5,852,717 A | * | 12/1998 | Bhide et al. ................. | 709/203 |
| 6,351,767 B1 | | 2/2002 | Batchelder et al. .......... | 709/219 |
| 6,408,360 B1 | | 6/2002 | Chamberlain et al. ....... | 711/124 |
| 6,725,333 B1 | * | 4/2004 | Degenaro et al. ............ | 711/118 |
| 6,826,557 B1 | * | 11/2004 | Carter et al. .................. | 707/2 |
| 7,461,262 B1 | * | 12/2008 | O'Toole, Jr. ................ | 713/182 |
| 2003/0140100 A1 | * | 7/2003 | Pullara ........................ | 709/203 |

OTHER PUBLICATIONS

Devaram, K., et al., "Soal Optimization Via Parameterized Client-Side Caching", Internet, Proceedings of the IAStED International Conference on Parallel and Distributed Computing and Systems (PDCS 2003) <<http://www.cis.ksu.edu/{devaram/Courses/ParameterizedCaching.pdf>>. Nov. 3-5, 2003, pp. 785-790.

Ibbotson, E., "XML Protocol Usage Scenarios—W3C Working Draft Dec. 17, 2001", Internet, <<http://www.w3.org/TR/2001/WD-xmlp-scenarios-20011217>>, Dec. 17, 2001, pp. 1, 2, 29-32.

(Continued)

*Primary Examiner*—Isaac M Woo
(74) *Attorney, Agent, or Firm*—Fitzpatrick, Cella, Harper & Scinto (57) ABSTRACT

A table is obtained comprising, for each request emanating from the client device, at least one line of correspondence between at least the address (U) of the request, a first filter (f) defining information to be kept for the request without modifying the sense of the request, a location containing a simplified request resulting from the application of the first filter to the request, and a location containing a response. In response to a request emanating from a client device, the corresponding line is selected, at least one condition for the supply of the response from the corresponding location is verified and, in the case of positive verification, the response is supplied to the client device from the location containing said response.

5 Claims, 5 Drawing Sheets

OTHER PUBLICATIONS

Chidlovskii, B., et al., "Semantic cache mechanism for heterogeneous Web querying", Computer Networks, Elsevier Science Publishers B.V., Amsterdam, NL, vol. 13, No. 11-16, May 17, 1999, pp. 1347-1360.

Ben-Menahem, A., et al., "Caching Architecture Guide For .Net Framework Applications", Internet, <<http://www.microsoft.com/downloads/details.aspx?familyID=80134FD6-2CD4-4B7E-9CE6-90EE1E28E7&displaylang=en>>, Mar. 28, 2003. pp. 13-23.

Chen, L., et al., "XCache—A Semantic Caching System for XML Queries", Internet, <<http://davis.wpi.edu/dsrg/WEBdbPapers/xcache_demo.pdf>>, Jun. 3-6, 2002, p. 1.

* cited by examiner

METHOD AND DEVICE FOR PROCESSING MESSAGES OF THE SOAP TYPE

BACKGROUND OF THE INVENTION

The present invention relates to the processing of messages exchanged between a client device and a server device via an intermediate device equipped with a cache.

Embodiments of the present invention have a general application in the processing of messages exchanged in a communication network, and more particularly the messages represented in markup language, for example messages represented according to SOAP (Simple Object Access Protocol).

It is known that, in order to reduce the traffic in a communication network, for example the Internet, intermediate devices are arranged forming caches on the communication network between the client devices and the server devices.

An intermediate device forming a cache acts invisibly by storing the requests from the client devices and the responses from the server devices.

Thus, when a client device makes a request for which the intermediate device forming a cache has already stored the associated response, the intermediate device forming a cache can reply directly to the client device without the request being transmitted to the server device.

This strategy doubly accelerates the response time for a client device, firstly because the intermediate device forming a cache is generally situated closer to it (in terms of network distance) and secondly because its request has not had to be processed by a potentially heavily loaded server device (the machine managing the intermediate device forming a cache can more easily be sized to satisfy demand than any server device).

In practice, some responses are valid only for a given period. For example, a stock exchange quotation will be valid for a few minutes, a weather map for a few hours, the first page of a monthly review will be valid for one month and a leading article will be valid indefinitely.

In such examples, an intermediate device forming a cache must not keep a response which is no longer valid since it would then supply an invalid response to the client device different from that which the client device would have obtained from the server device.

Recently, more and more dynamic contents has appeared on Internet sites.

For example, dynamic contents consist of responses from Internet services, in particular messages with tags, such as SOAP messages. Such messages with tags comprise blocks of information distributed between a first group of blocks forming a header of the message and a second group of blocks corresponding to the body of the message.

Dynamic content usually has a very short or indeterminate life and cannot be stored by an intermediate device forming a cache.

The architecture of the intermediate devices forming caches can therefore no longer be applied to sites supplying dynamic contents, which has a negative effect on the reactivity of the site for a user.

Technical solutions developed to manage dynamic contents of this type are already known.

For example, the document U.S. Pat. No. 6,408,360 describes a cache mechanism for a dynamic server device. This cache mechanism is designed to be integrated in a server device supplying dynamic content. When the server device receives a request for a page containing a dynamic content, the server device calls the application suitable for managing this content. In addition to the content, the called application generates information indicating the period of validity of this content. Thus the server device can store the response from the application and reply to other similar requests using the stored content without having to make a new call on the application, until the period of validity of the content expires.

A cache mechanism of this type improves the response time of the server device by avoiding unnecessary calculations. However, it is integrated in a server device rather than in an intermediate device forming a cache independent of the server devices. As a result a mechanism of this type does not make it possible to reduce data transfers on the Internet and consequently improve the response time for a user.

For its part, the document U.S. Pat. No. 6,351,767 describes a mechanism for determining whether a page constructed from several dynamic parts can be stored by a cache mechanism. This determination is made by analyzing the period of validity of each of the dynamic parts. However, here also, this document applies only to caches integrated in server devices constructing responses from several parts.

SUMMARY OF THE INVENTION

The present invention affords a solution to the problems of the prior methods mentioned above.

It thus aims to improve the processing of messages, in particular dynamic messages of the SOAP type, in intermediate devices forming caches not directly connected to server devices.

It relates to a method of processing information exchanged between at least one client device and at least one server device via an intermediate device forming a cache on a communication network, said processing method being implemented in the intermediate device forming a cache.

According to a general definition of the invention, the processing method comprises the following steps:

obtaining a table comprising, for each request emanating from a client device, at least one line of correspondence between at least the address of the request, a first filter defining information to be stored for the request without modifying the sense of the request, a location containing a simplified request resulting from the application of the first filter to the request, and a location containing a response; and in response to a request emanating from a client device, selecting the corresponding line, verifying at least one condition for the supply of the response from the corresponding location, and, in the case of positive verification, supplying the response to the client device from the location containing said response.

According to one embodiment, at least some lines in the table also comprise a location containing a simplified response which results from the application, to the response, of a second filter defining information to be stored for the associated response without modifying the sense of the response, and in response to a request emanating from a client device, provision is made for selecting the corresponding line, verifying at least one condition for supplying the simplified response from the corresponding location and, in the case of positive verification, supplying the simplified response to the client device from the location containing the simplified response.

The method according to the invention thus improves the processing of information exchanged on the communication network, particularly with regard to the functioning of the intermediate device forming a cache, by simplifying the requests and, where necessary, the responses so as to keep only the essential elements of the message without losing the sense of the message, this simplification being accompanied by a storage of the simplified requests, and where applicable the simplified responses, in suitable locations of the intermediate device forming a cache for subsequent supply of the simplified (or not) responses from said locations.

According to one embodiment, the method also comprises the step in which the first filter is applied to the request emanating from the client device, the simplified request thus calculated being compared with the simplified request contained in the location on the corresponding line, and the supply condition is true in the case of equality between the simplified request calculated and the simplified request in cache.

The first and second filters are, for example, different from each other or they may alternatively be identical.

According to one embodiment, the information in the first filter and/or the second filter emanate from the server device to the intermediate device forming a cache when a response is delivered in reply to a request.

According to yet another embodiment, the method also comprises a step of maintaining and/or updating lines in the table according to the obsolescence and/or a characteristic of each simplified request and/or response, simplified or not, to be supplied.

In practice, the information exchanged is of the message type represented in markup language, such as the SOAP protocol according to which the messages comprise blocks of information distributed between a first group of blocks forming a header of the message and a second group of blocks corresponding to the body of the message. In general, the body of the SOAP message represents the data transported by the message, whilst the header blocks contain information relating to these data, to the transport mechanisms, etc.

For example, the information on the first and/or second filter are contained in the header of the message exchanged.

Another object of the present invention is a device for processing information exchanged between at least one client device and at least one server device via an intermediate device forming a cache on the communication network, said processing device being integrated in the intermediate device forming a cache.

According to another aspect of the invention, the processing device comprises:
  a table comprising, for each request emanating from a client device, at least one line of correspondence between at least the address of the request, a first filter defining information to be stored for the request without modifying the sense of the request, a location containing a simplified request resulting from the application of the first filter to the request, and a location containing a response, and
  processing means able, in response to a request emanating from a client device, to select the corresponding line, to verify at least one condition for the supply of the response from the corresponding location and, in the case of positive verification, to supply the response to the client device from the location containing said response.

According to one embodiment, at least some lines in the table also comprise a location containing a simplified response resulting from the application to the response of a second filter defining information to be kept for the associated response without modifying the sense of the response, and the processing means are able, in response to a request emanating from a client device, to select the corresponding line, to verify at least one condition for the supply of the simplified response from the corresponding location and, in the case of positive verification, to supply the simplified response to the client device from the location containing the simplified response.

According to one embodiment, the processing means are also able to apply the first filter to the request emanating from the client device, to compare the simplified request thus calculated with the simplified request contained in the location of the corresponding line, and to supply the simplified request in the case of equality between the simplified request calculated and the simplified request in the cache.

According to another embodiment, the processing means are also able to maintain and/or update lines in the table according to the obsolescence and/or a characteristic of each simplified request and/or response, simplified or not, to be supplied.

Another object of the present invention is to provide an intermediate device forming a cache comprising means adapted to implement the processing method mentioned above, the intermediate device forming a cache comprising a processing device as referred to above.

Another object of the present invention is to provide a message exchange system in a communication network is provided comprising an intermediate device forming a cache as described above.

Another object of the present invention is an information medium which can be read by a computer system, possibly totally or partially removable, in particular a CD-ROM or a magnetic medium such as a hard disk or a diskette, or a transmittable medium such as an electrical or optical signal, containing instructions of a computer program for implementing a processing method in accordance with the invention, when this program is loaded in and executed by a computer system.

Finally, another object of the present invention is to provide a computer program is provided stored on an information medium, said program containing instructions for implementing a processing method in accordance with the invention, when this program is loaded in and executed by a computer system.

Other characteristics and advantages of the invention will emerge in the light of the following detailed description and the drawings, in which:

DETAILED DESCRIPTION OF THE INVENTION

The present invention relates to the processing of messages exchanged between a client device and a server device, via an intermediate device equipped with a cache.

The description which follows is based on an embodiment applied to messages represented in markup language, for example messages represented according to SOAP (Simple Object Access Protocol). Obviously the invention applies to other markup languages, such as HTML, XML, XHTML, etc.

In practice, according to the SOAP protocol, the messages comprise blocks of information distributed between a first group of blocks forming a message header and a second group of blocks corresponding to the body of the message. In general, the body of the SOAP message represents the data transported by the message, whilst the header blocks contain information relating to this data, to the transport mechanisms, etc.

For example, a SOAP message in request/response mode is exchanged between a client device and a server device to enable a user to interrogate a meteorological server.

With regard to the request sent by the client device, the message has the following content:

```
<?xml version="1.0" encoding="utf-8"?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Header>
        <user:user
            xmlns user="http://www.example.com/User">
            <user:firstName>Hervé</user:firstName>
            <user:lastName>Ruellan</user:lastName>
        </user:user>
    </soap:Header>
    <soap:Body>
        <weather:getWeather
            xmlns:weather="http://www.example.com/Weather">
            <weather:location>
                <city>Rennes</city>
                <country>France</country>
            </weather:location>
            <weather:date>25 décembre 2002 12:00</weather:date>
        </weather:getWeather>
    </soap:Body>
</soap:Envelope>
```

With regard to the response sent by the meteorological server device, the message has the following content:

```
<?xml version="1.0" encoding="utf-8"?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Header>
        <weather:seaForecast
            xmlns:weather="http://www.example.com/Weather">
            ...
        </weather:seaForecast>
    </soap:Header>
    <soap:Body>
        <weather:weatherForecast
            xmlns:weather="http://www.example.com/Weather">
            <weather:location>
                <city>Rennes</city>
                <country>France</country>
            </weather:location>
            <weather:date>25 décembre 2002 12:00</weather:date>
            <weather:summary>Light snow</weather:summary>
            <weather:temperature>
                <min unit="celsius">-3</min>
                <max unit="celsius">-3</max>
            </weather:temperature>
        </weather:weatherForecast>
    </soap:Body>
</soap:Envelope>
```

In this example, the request consists principally of the body of the message, with the element weather:getWeather and its content (place and date for the weather information).

This request also contains user information in a header "user:user", which is optional and not specifically used by the server device.

For its part, the direct response to the request is contained in the body of the response message, with the element weather:weatherForecast.

This response also contains supplementary information in a header which describes the weather at sea (it was possible to add this element either in relation to user preferences known to the server device or automatically by the server device in order to promote its other services).

Conventionally, a manager of an intermediate device forming a cache stores in this example the complete request as well as the complete response.

Thus a second request which is similar but containing no user name or a different user name cannot be processed by the manager of the intermediate device forming a cache, whereas this manager has available all the information for responding to it.

In order to improve its efficacy in this example, the manager of the intermediate device forming a cache according to the invention stores a simplified request whilst deleting the header defining the user and likewise stores only a simplified response whilst deleting the header defining the weather at sea.

The processing method according to the invention does not consider a SOAP message to be an inseparable whole, but seeks to take into consideration the structure of the SOAP messages unlike conventional cache systems.

Thus it becomes possible to keep in cache only part of a SOAP message. The aim is to keep only the essential elements of the message before storing it in an intermediate device forming a cache, whilst keeping the sense of the message.

However, in order to achieve this simplification, this assumes that the manager of the intermediate device forming a cache knows the structure of the requests and responses exchanged, which in practice is not the case.

On the other hand, the server device processing the request and generating the response knows these structures. Thus the server device can transmit this information to the manager of the intermediate device forming a cache, the latter using it to improve its functionality.

This information can be transmitted in the response message in the form of a header indicating the important parts of the request and of the response. Thus, for the previous example, the response contains the following header:

```
<cache:soapCache
    xmlns:cache="http://www.example.com/SoapCache">
    <cache:request>
        <cache:element>/Envelope/Header/Preference</cache:element>
        <cache:element>/Envelope/Body/getweather</cache:element>
    </cache:request>
    <cache:response>
        <cache:element>/Envelope/Body/weatherForecast</cache:element>
    </cache:response>
</cache:soapCache>
```

This header defines which are the elements to be stored in the request and response. The elements to be kept are described in XML elements (cache:element) using the syntax XPath, which makes it possible to refer to a part of an XML document.

Thus, in the request, it is necessary to keep the element getWeather contained in the body of the message, as well as the element Preference contained in the header of the message. The latter element is not included in the previous example of a request but, as it makes it possible to describe the user preferences, such as for example the temperature unit to be used, it has an influence on the content of the response.

In addition, in the response, only the weatherForecast element is contained in the body of the response.

In practice, the simplified elements are stored in a memory of the intermediate device forming a cache. For example, for each request, the simplified elements are stored in a table TA of the type:

| Request address | Filter | Request | Response | Cache info |
|---|---|---|---|---|
| U1 | f1 | Q1 | A1 | I1 |
| ... | ... | ... | ... | ... |

The table comprises, for each request emanating from the client device, at least one line of correspondence between at least the address of the request U, a first filter defining information to be kept for the request without modifying the sense of the request, where necessary a second filter defining information to be kept for the associated response without modifying the sense of the response, a location containing a simplified request Q resulting from the application of the first filter to the request, and where necessary a location containing a simplified response A resulting from the application of the second filter to the response.

The first and second filters can be different from each other or identical. In the example mentioned above the first and second filters are identical and represented under the designation f. The filter or filters comprise an XML element defining the information to be kept in the request and/or the response.

In addition, a last column contains conventional information I of an intermediate device forming a cache, such as the period of validity of the response, etc. This information depends on the protocol used (HTTP, SMPT, etc) underlying SOAP.

It is possible for several lines to correspond to the same request address but for different requests. Thus the previous example will be stored in a line of the table but the same request with a supplementary header of preferences indicating the use of degrees Fahrenheit will be stored in another line of the table.

Figure 1:
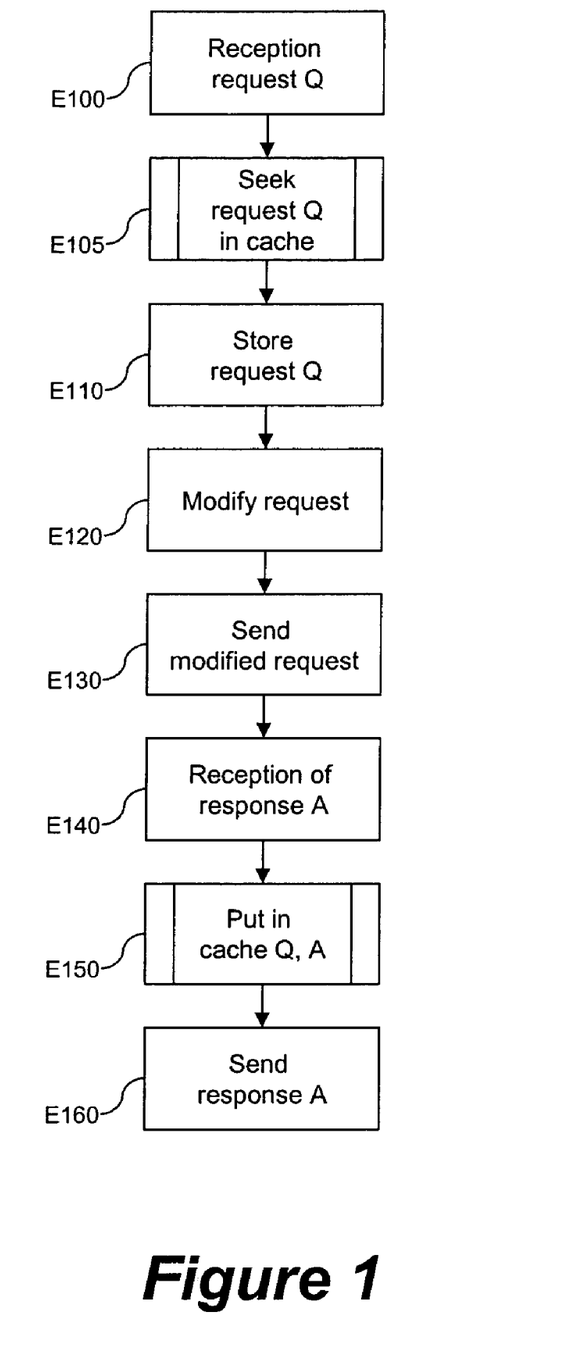
FIG. 1 is a flow diagram illustrating the overall processing of a request by the intermediate device forming a cache in accordance with the invention.

With reference to FIG. 1, the global processing of a request by the intermediate device forming a cache has been shown.

When a request Q is received (step E100), the method begins by verifying whether the request Q is already present in the intermediate device forming a cache (step E105).

Figure 4:
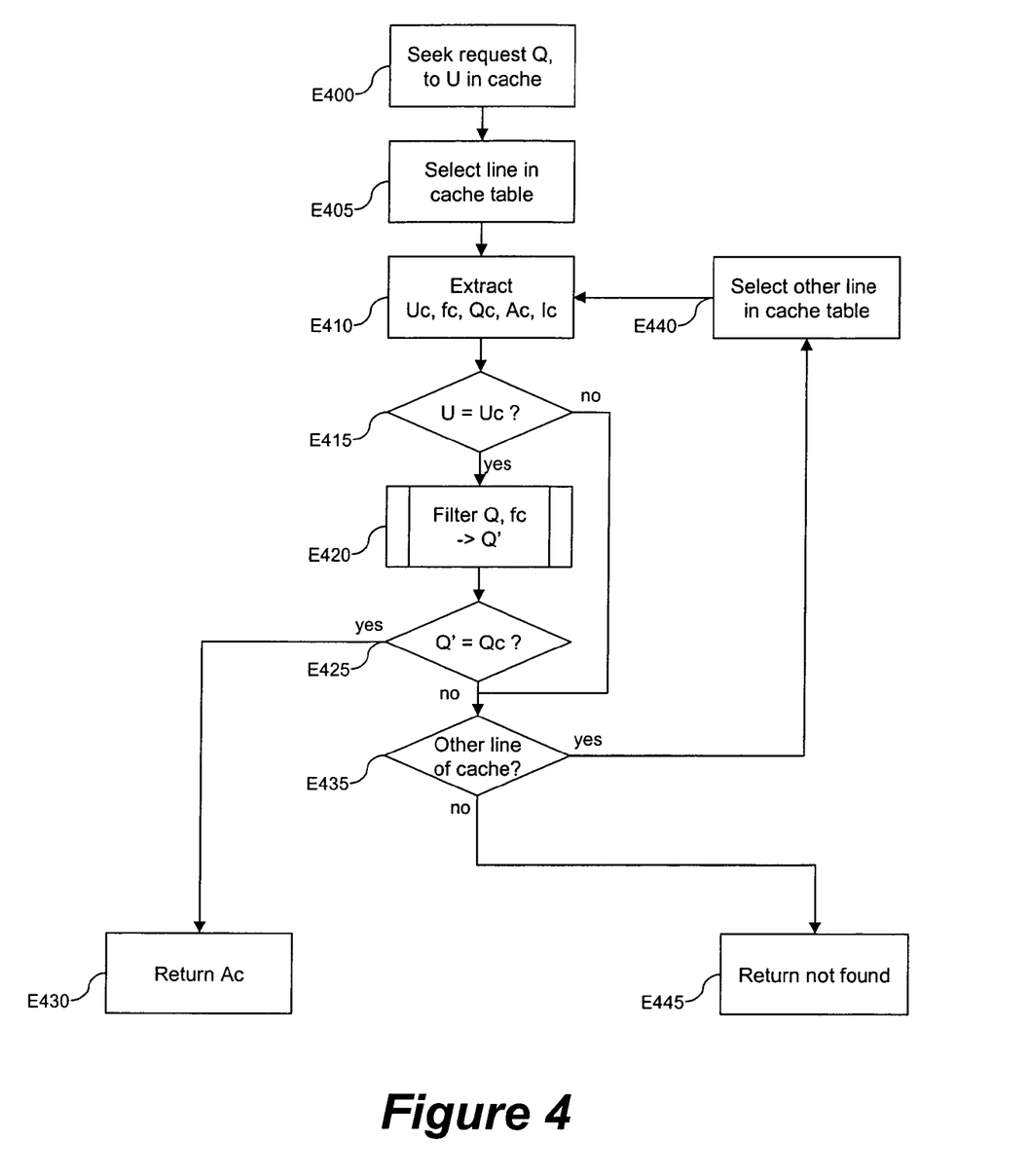
FIG. 4 is a flow diagram illustrating the supply of a simplified response in response to a request emanating from a client device in accordance with the invention.

The method used to seek the request Q in the cache (step E105) is the method described in the algorithm with reference to FIG. 4.

If the request Q is absent from the intermediate device forming a cache, then the method continues by storing the request Q in a temporary memory. Then it modifies the request so that the response A reaches it (step E120). It then sends this modified request to the server device (step E130).

When the response A is received (step E140), the method attempts to put it in the intermediate device forming a cache (step E150) and then the method returns this response A to the client device (step E160).

Figure 2:
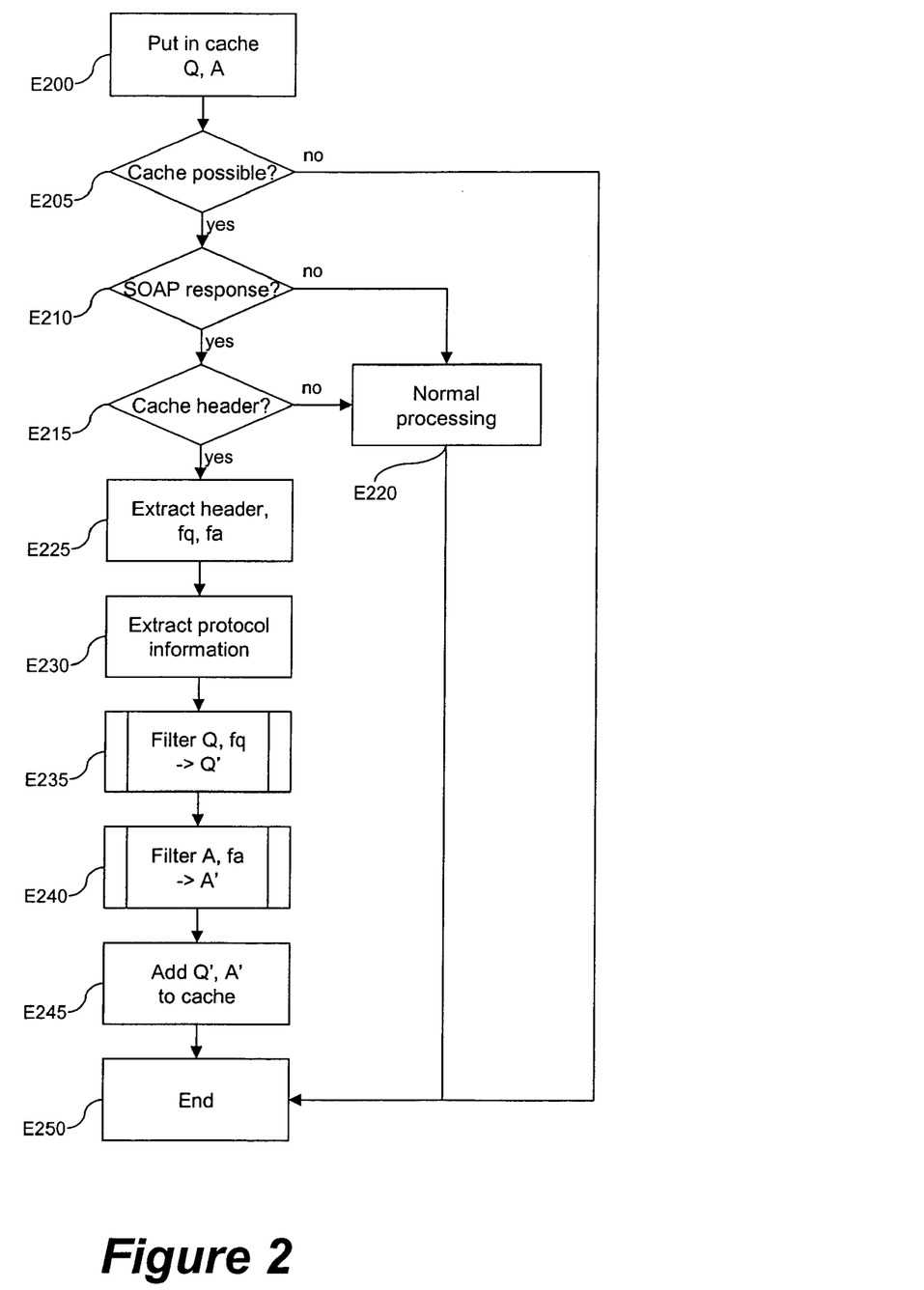
FIG. 2 is a flow diagram illustrating a request and the associated response being put in cache in accordance with the invention.

With reference to FIG. 2, the putting in cache of a request Q and the associated response A has been shown (step E200). First of all, the system verifies, in a conventional manner, that the response A can be stored in cache (step E205). This verification can for example use the information of the transport protocol, such as the HTTP header "cache" for example.

If the response A can be stored in cache, then the method checks whether it is a SOAP message (step E210). Then it checks that the response contains a filter header, also referred to as a cache directive header (step E215).

If one of these conditions is not satisfied, the method continues as with a normal response (step E220). Otherwise the method continues by extracting the cache directive header from the response (step E225) and extracting the two parts corresponding to the request fq and to the response fa. These two parts, as described previously, make it possible to describe which are the important parts of the request and response (first and second filters).

The method then extracts from the response the cache information relating to the protocol, such as, for example, the period of validity of the response (step E230).

Then the method filters the request (step E235) and the response (step E240) in order to obtain therefrom a simplified version which can be kept in the intermediate device forming a cache. Finally, it stores this information in a new line in the table TA (step E245), adding thereto the destination address of the request, the cache directive header (first and/or second filters), the filtered request and response (simplified) and the cache information relating to the protocol.

Figure 3:
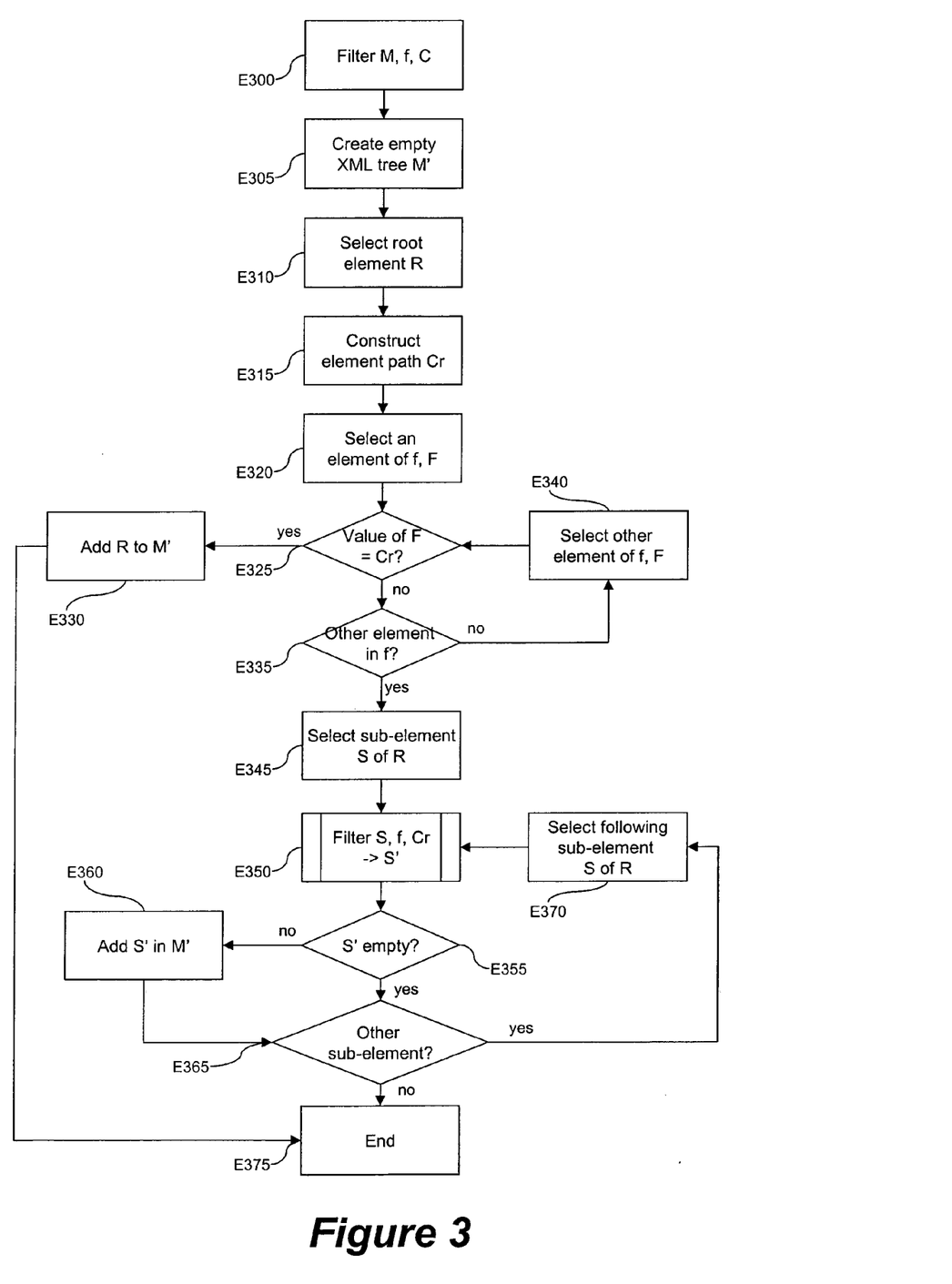
FIG. 3 is a flow diagram illustrating how an XML element is simplified using a filter in accordance with the invention.

With reference to FIG. 3, it is shown how an XML element is simplified using a filter contained in a cache directive. This algorithm is recursive, when it is applied to an XML element, it is (possibly) also applied to the sub-elements contained in this element.

The parameters supplied to this algorithm are the elements to be simplified M, the filter f and the path C leading to the element M. This path is the list of names of the parent elements of the element M, separated by the character '/'. Thus, in the previous example, the path taken at the same time as the element getWeather is /Envelope/Body. If this path is not specified when invoking the algorithm, it is considered to be the root path, "/". This is the case when invoking this algorithm from FIG. 2.

The algorithm begins by creating an XML tree, M', for containing the result, this tree being initially empty (step E305). Then it selects the root element of M, R (step E310). This root element may be different from M, if M contains particular entities such as comments or processing instructions. It then constructs the path Cr associated with the root element R by adding the name of this element to the parameter C (step E315).

Next the algorithm selects an element F of the filter f (for example <cache:element>/Envelope/Header/Preference</cache:element> in the previous example) (step E320). Then it compares (step E325) the value of the content of F (/Envelope/Header/Preference for the same example) with the path of the element M, Cr.

If the two are equal (within the meaning of XPath) then the root element R is added to the result M' (step E330) and the algorithm ends (step E375).

In the contrary case, the method checks whether the filter contains other elements (step E335) and, if such is the case, selects another element (step E340) and performs step E325 once again.

If all the elements of the filter f have been used, then the algorithm will apply itself recursively to the sub-elements of R. For this purpose, it selects a sub-element S of the root element R (step E345), and is then called recursively (step E350), passing as parameters the sub-element S, the filter f, and the path Cr. The result of this processing is stored in the sub-element S'.

If the sub-element S' is not empty (step E355), then the sub-element S' is added to the element M' (360). The sub-element S' is added not directly to the element M' but inside an element having the same name as the root element R. In addition, all the global attributes are added to this element, that is to say in a naming space defined by an XML standard.

In all cases, if another sub-element of R exists (365), it is selected (step E370) and steps E350-E360 are applied to it.

Otherwise the algorithm ends.

It should be noted that, for the correct functioning of the system, this algorithm must add any prologue contained in an XML document (such as for example <?xml version="1.0" encoding="uff-8"?>).

With reference to FIG. 4, this shows the algorithm for seeking a request Q sent to an address U in an intermediate device forming a cache according to the invention (step E105, FIG. 1).

Firstly, the algorithm selects one of the lines in the table TA (step E405). Then it extracts from this line the destination address of the request, Uc, the filter to be applied, fc, the request stored in cache, Qc, and the corresponding response Ac, as well as the complementary information related to the protocol, Ic (step E410).

Then, if the address of the request U and the address stored in cache, Uc, are equal (within the meaning of the URIs) (step E415), the algorithm simplifies the request Q by applying the filter fc to it, in order to obtain Q' (step E420). For this purpose, the algorithm has recourse to the one described with reference to FIG. 3. Next it compares this simplified request Q' and the request stored in the table TA, Qc (step E425). This comparison is made by comparing the XML documents, and taking account of written equivalences for the XML documents.

If the request Qc is found in the cache, the associated response Ac is sent (step E430). This associated response Ac is returned to the client device after being validated and the process is stopped.

If these two requests Q' and Qc are equal at step E425, the request Q is not sent to the server.

In the contrary case, or if the test E415 is negative, the algorithm checks whether other cache lines are available (step E435) and, if such is the case, selects one of them (step E440) before once again applying steps E410-E425.

In the contrary case, the algorithm ends by sending back a result indicating that no response corresponding to the request Q is available in the cache.

It should be noted that, if the information Ic indicates that the associated Ac response stored is no longer valid, the associated response Ac is not returned to the client device and then the corresponding cache line is removed.

Figure 5:
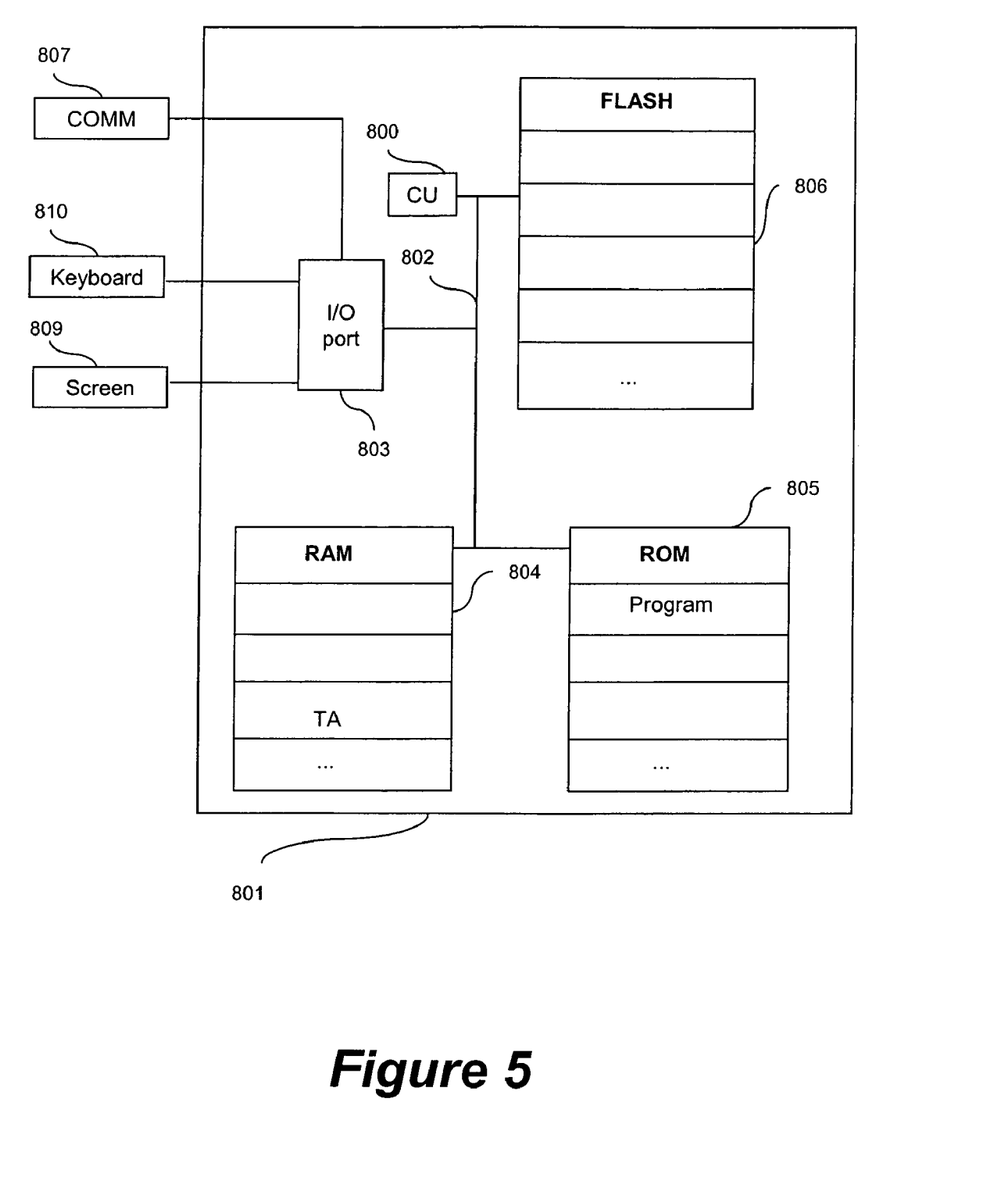
FIG. 5 is a schematic representation of an intermediate device forming a cache according to the invention.

FIG. 5 depicts schematically an intermediate device forming a cache adapted to implement a processing method according to the present invention, in a preferred embodiment.

This intermediate processing device could, in particular, consist of a computer.

In the example embodiment described here, the intermediate payment device comprises a communication card 807 for connecting the intermediate device to a communication network, a keyboard 810, a screen 809, connected to an input/output port 803 of a processing card 801.

The processing card 801 comprises, connected together by an address and data bus 802:
a central processing unit 800;
a random access memory RAM 804;
a read only memory ROM 805;
a non-volatile FLASH memory 806, and
the input/output port 803.

Each of the elements illustrated in FIG. 5 is well known to persons skilled in the art of microcomputers and, more generally, information processing systems. These common elements are therefore not described here.

The random access memory 804 comprises, in particular, a table TA. This table could be stored in any other storage means of the intermediate device.

The read only memory 805 is adapted to store the operating program of the central processing unit 800. It contains, in particular, a register "Program" for storing the instructions of a program implementing a processing method according to the invention, as described above with reference to the flow diagrams in FIGS. 1 to 4.

The processing device comprises conventional communication means known to persons skilled in the art, adapted to communicate, by means of requests and messages, with other devices in the communication network.

These communication means consist, in particular, of the communication card 807 and portions of computer code stored in the read only memory ROM 805 using conventional protocol layers such as TCP/IP for example.

Whatever the case, these communication means constitute reception means adapted to receive and/or send the requests and/or responses.

The communication means are, in particular, adapted to recognize the type of request received and to extract the various fields therefrom.

The invention claimed is:

1. A method of processing information exchanged between at least one client device and at least one server device via an intermediate device forming a cache, said processing method being implemented in the intermediate device, the processing method comprising the steps of:

receiving a first response from a server device transmitted in response to a first request from a client device;

obtaining a second request sent from a client device to the server device;

modifying at least one of the first and second requests according to a first filter included in the first response;

comparing the first and second requests as modified; and returning a second response in response to the second request, said second response including or not, in accordance with the result of the comparison, at least a part of the first response.

2. A method according to claim 1, wherein, in said modifying step, the first response is modified according to a second filter included in the first response, and the modified first response is at least a part of the second response returned in said returning step in response to the second request in accordance with the result of the comparison.

3. A computer-readable medium that stores a computer program for implementing a processing method according to claim 1, when this program is loaded in and executed by a computer.

4. An intermediate apparatus via which information between at least one client device and at least one server device is exchanged, and forming a cache, comprising:
- receiving means for receiving a first response from a server device transmitted in response to a first request from a client device;
- obtaining means for obtaining a second request sent from a client device to the server device;
- modifying means for modifying at least one of the first and second requests according to a first filter included in the first response;
- comparing means for comparing the first and second requests as modified; and
- returning means for returning a second response in response to the second request, said second response including or not, in accordance with the result of the comparison, at least a part of the first response.

5. An apparatus according to claim 4, wherein said modifying means modifies the first response according to a second filter included in the first response, and said returning means returns the modified first response as at least a part of the second response in response to the second request in accordance with the result of the comparison.

* * * * *